United States Patent Office 3,520,381
Patented July 14, 1970

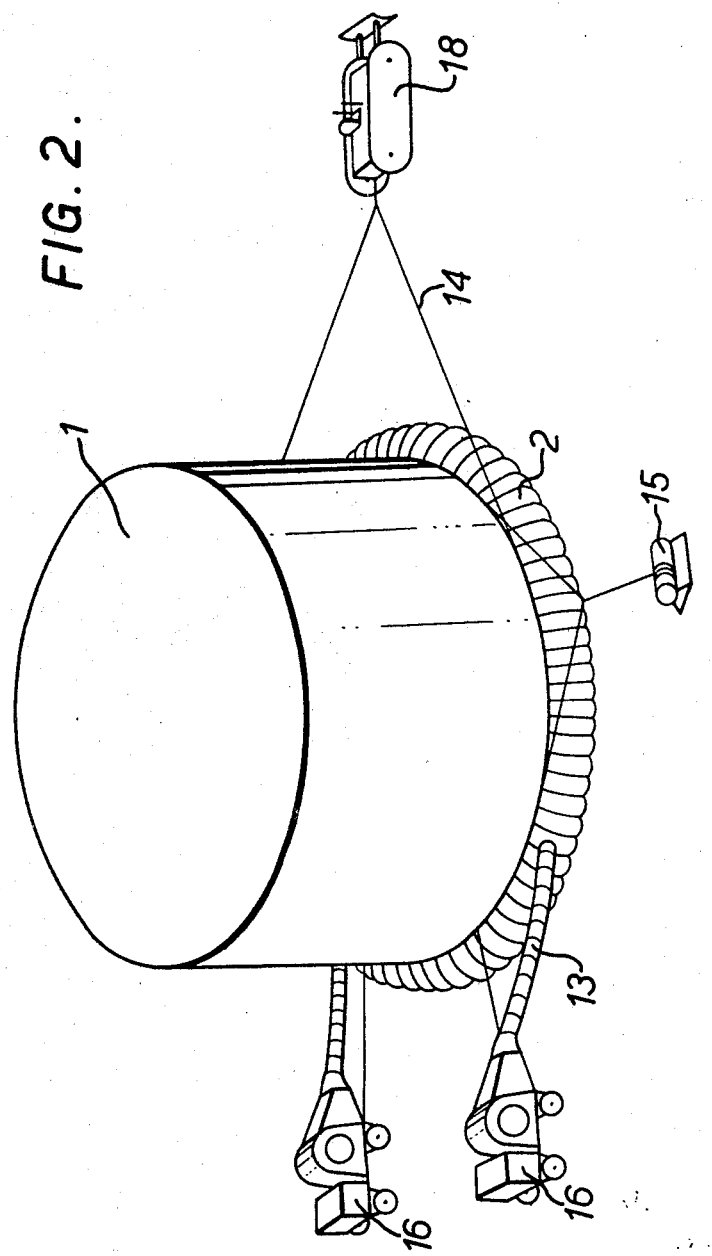

3,520,381
METHOD AND APPARATUS FOR
MOVING STORAGE TANKS
Michael A. Pinder, Teddington, England, assignor to Esso
Research and Engineering Company, a corporation of
Delaware
Filed Nov. 1, 1967, Ser. No. 679,783
Claims priority, application Great Britain, Nov. 4, 1966,
49,587/66
Int. Cl. B60v 1/16
U.S. Cl. 180—127                                 10 Claims

ABSTRACT OF THE DISCLOSURE

The instant disclosure is directed to a method of moving storage tanks. A flexible skirt is circumferentially attached to the tank near its bottom, the skirt being so positioned that when the tank is raised, the skirt is capable of extending downwardly. A sufficient amount of compressed fluid is then introduced into the space beneath the tank bounded by the skirt until a fluid cushion is established which supports the tank off the ground. This fluid cushion allows for relative ease in moving the tank along the ground.

---

This invention relates to a method of moving storage tanks, especially large tanks for the storage of petroleum products, water and other fluids.

At refineries and other places where there are a number of storage tanks, it is necessary from time to time to move a tank. Since these tanks are often of large dimensions, i.e. of the order of 20 to 150 ft. in diameter and 10 to 50 ft. high, moving such tanks by the use of rollers or bogies (the tank being too large for cranes) is often a lengthy, difficult and expensive process. Since the route has to be prepared to accept the localised loads, the tank must also be braced, and gradients and bends are difficult to negotiate. Often, the removal of such a tank is very costly. Very large winches are required to move the tank, and often tanks are damaged in the process and require expensive rectification work.

According to this invention storage tanks can be moved by a cheaper and quicker method which is less liable to cause damage to the tank and which often provides a better and cheaper means by which the tank can be tested after moving. The method comprises attaching a flexible skirt to the tank around the side wall or walls thereof or to the bottom thereof so that when the tank is raised in position the skirt is capable of extending downward beneath the tank, introducing pressurized fluid into the space beneath the tank bounded by the skirt, allowing the flow of fluid to continue until a fluid cushion is established which supports the tank off the ground and thereafter allowing the tank to be moved along the ground. This method is eminently suitable for moving large tanks where the question of a supporting platform or suspension from above is quite impracticable.

The flexible skirt by which term means a skirt having at least a portion thereof which is flexible can be made of any suitable flexible material, for example natural or synthetic rubber, or plastic material. Such materials are preferably reinforced with fibres or cords for example with nylon fibres, wire mesh, synthetic or natural fibres, e.g. rayon or cotton fibres or fibre glass. The fluid losses from the lower periphery of the skirt must be minimal both when the tank is stationary and is being moved, and at all conditions when the tank is being raised. In general, the flexible skirt should have sufficient flexibility to allow it to be deflected locally if being forced against an object, but should have sufficient rigidity so that when the fluid cushion is established, it resists outward deflection and extends downward from the bottom of the tank. It is preferable if the skirt does not impose too much friction when the tank is being moved along the ground. In addition, so that the tank bottom can be inspected the skirt should preferably be capable of accepting the insertion of wood blocks without undue air loss. Alternatively, the flexible skirt can be made largely of rigid material, but terminating in a flexible seal portion where the compressed fluid emerges from the cushion.

In order that the skirt can be used for different storage tanks it is preferable if it is made of sections, so that its size can be altered relatively simply. The depth of the skirt should be sufficient to clear the ground of the lowermost part of the tank bottom, plus an extra amount sufficient to clear obstacles. Thus, if the tank has a conical bottom, the depth of skirt should be sufficient to raise the cone bottom clear of the ground level plus an allowance for clearing obstacles.

The skirt can be made of segments, in which case the material need not itself be resilient, since the way in which the segments are formed and attached to the tank gives the skirt resiliency. Preferably the segmented skirt comprises a plurality of convoluted segments connected together along their edges so that the whole skirt becomes fluted in appearance. As another alternative, the skirt may be conical in shape so that the lower edges thereof cannot be displaced by the flow of fluid.

The skirt is preferably attached to the tank around the lower periphery thereof, i.e. the lower few feet of the side wall or walls of the tank. Preferably the skirt is attached by means of adhesive or gripped by an outer inflatable ring to the lower part of the side wall or walls of the tank so that sufficient of the skirt projects below the bottom of the tank to meet the requirements defined above, i.e., to clear the ground of the tank bottom and to clear obstacles. Alternatively, the skirt can be attached by mechanical means to the tank, e.g. by steel straps.

When the skirt has been attached to the tank compressed fluid usually gas such as pressurised air, is introduced into the space beneath the tank bounded by the skirt.

If the base on which the tank has been constructed is relatively porous then the pressurised fluid will percolate through to the underside of the tank bottom and will cause the tank to rise so that it may then be moved.

It the base is not porous then channels may be excavated beneath the tank to allow the fluid to form a cushion beneath the tank. Alternatively the tank might be raised slightly by the use of jacks to enable the fluid to form a cushion, thus supporting the tank off the ground.

The fluid can be introduced into the space beneath the bottom of the tank by means of a flexible or rigid duct or through a hole in the bottom of the tank. In practice, to support a tank 50 ft. diameter and 30 feet high it is probable that one would require about 70,000 cu. ft. of air/minute at a pressure of about 0.5 lb./sq. in. gauge. Gas preferably air, can be supplied by means of blowers, and for a tank of the above-mentioned dimensions a blower of 200 BHP would be suitable, although smaller units might be more convenient. The blower units can be mounted separate from the tank, and can be transported separately.

Once the fluid cushion is established supporting the tank off the ground the flow of fluid is maintained whilst the tank is allowed to move along the ground.

To move the tank along the ground, it may be towed with tow ropes or steel hawsers from vehicles such as lorries, or bulldozers or from small winches either anchored to the ground or on vehicles. Alternatively the tank may be pushed by a vehicle such as a bulldozer. In addition to the main motive force the tank must be restrained in at least two other directions by either hand lines or cables attached to other winches or vehicles. Pulleys may be used where there is insufficient space to install a winch.

In order to avoid any undue strain on the bottom of the tank, in the case of tanks having a roof, it is preferable if when the fluid cushion is maintained beneath the bottom of the tank, the tank itself is inflated to approximately the same pressure as that exerted by the fluid cushion on the bottom of the tank. If the tank does not have a roof, weights or ballast can counteract the upward pressure on the bottom of the tank due to the fluid cushion. The presence of ballast can also improve the stability of the tank: Alternatively mechanical strengthening may be necessary.

Generally the fluid cushion will distribute the loading evenly over the bottom of the tank such that the stresses caused are acceptable. The stresses are less than would be experienced if the tank were floated on water due the fact that the skirt itself takes part of the lifting forces.

The normal method by which tank bottoms are inspected for leaks after removal is by the use of a vacuum box from the inside of the tank together with soap. The presence of an air cushion beneath the tank enables a test with soap to be carried out much more cheaply and quickly immediately prior to final positioning.

The process of the invention is particularly suitable in moving large storage tanks, e.g. for the storage of petroleum products, at refineries. It is possible therefore to install storage tanks which in the first instance are movable. Such movable storage tanks comprise a flexible skirt attached, and preferably detachably attached, to the side wall or walls or bottom of the tank. Associated with this tank is a source of pressurised fluid, e.g. air, and an injector for said fluid. Preferably the source of pressurised fluid and/or injector are movable with the tank, e.g. they may be capable of being towed with the tank.

A storage tank fitted with a flexible skirt so that it can be moved by the process of the invention is now described with reference to the accompanying drawings in which:

FIG. 2 shows a view of the tank being maneuvered by towing and winching.

Figure 1:
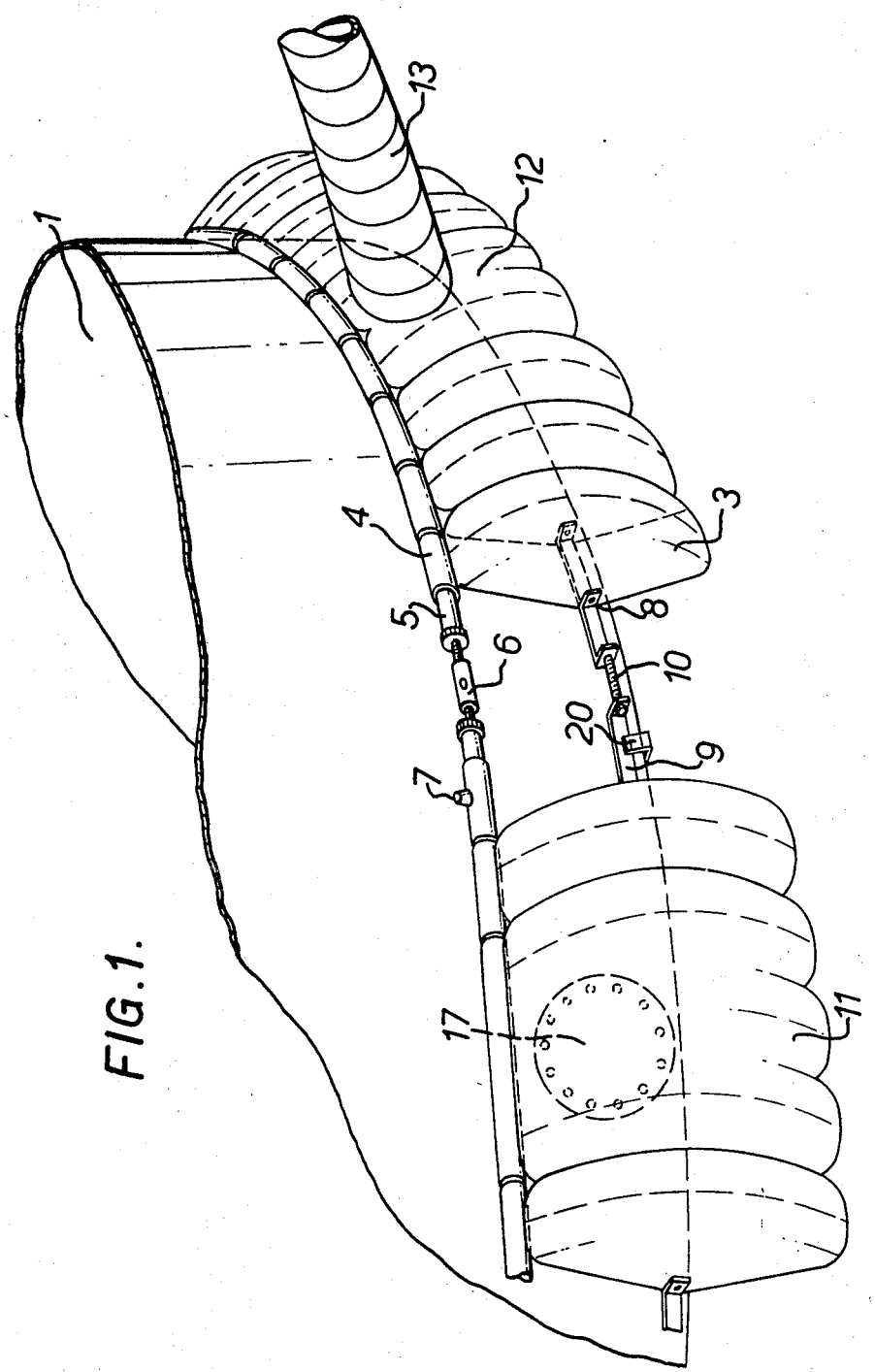
FIG. 1 shows part of the skirt attached to the tank with segments omitted for clarity.

Referring to the drawings the tank 1, has attached thereto a segmented skirt 2. The skirt comprises separate segments 3, which are sealed together by air pressure only. To the top of these segments a loop 4 is attached through which a hose 5 is passed. The hose is tightened by "bottle screw" 6 and is inflated at valve 7. At the centre of the sides of the segments there are eyelets 8 through which bolts are passed thereby attaching the segments to a steel strap 9 which is tightened around the circumference of the tank by bolts 10 and is prevented from slipping by brackets 20 which are inserted beneath the rim of the tank. Specially designed segments 11 are made to clear manholes 17 and tank connections, as also are feed segments 12 to which the flexible air ducts 13 are attached.

The skirt segments are made from nylon reinforced neoprene and are constructed by sewing two similar shapes together. The shapes approximate to the sector of a circle with an included angle of 135°. They are sewn along the arc and then turned inside out.

To lift the tank air is fed into the skirt until it assumes the correct shape or is primed. The pressure and flow rate are then increased causing air to percolate through the porous foundation until there is a sufficient area of tank bottom exposed to the necessary pressure when the tank is caused to lift clear of the ground.

To move the tank a cable is passed around the circumference of the tank and to this towing cables 14 are attached passing to a bulldozer 18. Other cables are taken to a winch 15 for accurate control and the blowers 16 which are mounted on trailers are towed behind the tank 1.

The tank is thus moved to the required position.

What is claimed is:

1. A method of moving a normally permanent and substantially empty storage tank comprising attaching a flexible skirt, in a fixed and air-tight relationship to said tank, around the side wall thereof by inflating an inflatable ring passing through said skirt and circumferentially disposed about said tank so that when the tank is raised in position the skirt is capable of extending downward beneath the tank, introducing pressurized fluid into the space beneath the tank bounded by the skirt, allowing the flow of fluid to continue until a fluid cushion is established which supports the tank off the ground, and moving the tank along the ground to the required position.

2. The method of claim 1 wherein the fluid cushion is established beneath the tank by excavating channels beneath the base of the tank, when said base is nonporous.

3. The method of claim 1 wherein the tank is enclosed by a roof and said tank is inflated to approximately the same pressure as that exerted by the fluid cushion beneath said tank.

4. A method of moving a normally permanent and substantially empty storage tank of large dimensions comprising encircling a lower portion of the tank with an inflatable ring, attaching a plurality of individual flexible segments to said ring to form a flexible skirt around the side wall of the tank, preliminary tightening said ring into contact with said tank, inflating the ring to complete the tightening of the ring and segments to said tank, raising the tank so that said skirt extends downward beneath the tank, introducing pressurized fluid into the space beneath the tank bounded by the skirt until a fluid cushion is established to support the tank off the ground, inflating said tank with a pressurized fluid to a pressure approximately equal to the pressure exerted by the fluid cushion on the bottom of the tank, towing said tank to a new location, maintaining the flow of pressurized fluid to maintain the fluid cushion while said tank is being towed, and restraining said tank in a direction other than the direction of towing while said tank is being towed.

5. A movable storage tank comprising:
(a) means for introducing a pressurized fluid below the bottom wall of said storage tank;
(b) a flexible skirt temporarily attached to the side wall of said tank, enclosing the fluid introduced under said tank; and
(c) an inflatable ring disposed around the lower part of said side wall of said tank and passing through said skirt and being the sole means when inflated for attaching at least a portion of said skirt to said storage tank.

6. The tank of claim 5 wherein the skirt comprises a plurality of convoluted segments connected together along their edges so that the whole skirt is fluted in appearance.

7. The tank of claim 6 wherein each segment of the skirt is provided with an attaching means, comprising a loop, through which said inflatable ring passes, so as to facilitate attachment of the skirt to the tank.

8. The tank of claim 6 wherein the segments of said skirt are further provided with means fastened to said tank and to the center of the sides of said segments whereby said segments are prevented from slipping.

9. The tank of claim 6 wherein each of said skirt segments is approximately shaped as a sector of a circle with an included angle of 135°.

10. A movable storage tank comprising:
(a) a permanent and substantially empty storage tank of large dimensions having side walls;
(b) a plurality of separated convoluted segments, each segment provided with a loop at the top of said segment, said segments together comprising a flexible segmented skirt;

(c) an inflatable ring provided with tightening means and fluid inlet means disposed around the lower part of said side walls, said ring passing through said loops of said skirt, attaching said skirt to said tank when said ring is tightened and inflated;

(d) a strap disposed around the circumference of said side wall of said tank below said inflatable ring, said strap being connected to said skirt at the center of the sides of said segments, thereby preventing said segments from slipping;

(e) a flexible fluid duct in communication with the space beneath said tank bounded by said skirt by means of an opening in said skirt through which said duct is disposed;

(f) a fluid pumping means in communication with said duct to provide a fluid cushion beneath said tank bounded by said skirt;

(g) towing means in communication with said tank by means of towing cables, to tow said tank when said tank is provided with said fluid cushion; and (h) winching means connected to said tank by means of cables to provide stability to said tank when said tank is being towed.

References Cited

UNITED STATES PATENTS

| | | | |
|---|---|---|---|
| 3,104,496 | 9/1963 | Macks | 180—125 X |
| 3,232,366 | 2/1966 | Cockerell | 180—124 |
| 3,385,390 | 5/1968 | Guienne | 180—116 |
| 242,668 | 6/1881 | Male. | |
| 3,166,137 | 1/1965 | Cooper | 180—127 |
| 3,174,573 | 3/1965 | Chaplin | 180—127 X |
| 3,211,246 | 10/1965 | Lewis | 180—127 |
| 3,282,359 | 11/1966 | Satterfield | 180—127 |
| 3,291,236 | 12/1966 | Foshag et al. | 180—129 X |
| 3,326,035 | 6/1967 | Hirota et al. | 73—40 |
| 3,353,617 | 11/1967 | Hopkins | 180—127 |

FOREIGN PATENTS

| | | |
|---|---|---|
| 938,664 | 10/1963 | Great Britain. |

A. HARRY LEVY, Primary Examiner

U.S. Cl. X.R.

52—127; 73—40; 214—1, 152; 280—150